Patented July 25, 1933

1,919,308

UNITED STATES PATENT OFFICE

FRIEDRICH WILHELM STAUF, OF COLOGNE-DEUTZ, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PURIFICATION OF ALKALI METAL HYDROXIDE LIQUORS

No Drawing. Application filed June 24, 1929, Serial No. 373,497, and in Germany July 2, 1928.

The present invention concerns the purification of waste alkali metal hydroxide liquors which are contaminated by cellulose and similar products, by treating the liquors with manganic or permanganic acid salts of the alkali metals.

In chemical processes, in particular in the manufacture of artificial silk, waste alkali metal hydroxide liquors are produced which are contaminated by cellulose or cellulose like substances.

In the term "cellulose like substances" the compounds are intended to be included which are formed by treating cellulose with chemicals in the manufacture of artificial silk, as for example α-cellulose, glucose and other carbohydrates.

For carrying out the purification of such lyes various processes have been proposed; thus, for example, solid oxidizing substances containing oxygen (chlorates, nitrates and the like) are employed for this purification (compare British Specification No. 217,685). It is a disadvantage, however, that after the purification of the lye by the compounds in question, yielding oxygen, new impurities are formed which are often very undesirable for the re-employment of the lyes. Thus for example, sodium chlorate gives sodium chloride.

In accordance with the present invention alkali metal salts of manganic or permanganate acid are employed as oxidizing agents, which do not display this disadvantage. For example, when sodium permanganate is used for the purification of caustic soda lye which is contaminated with cellulose, the organic substance is oxidized completely to carbon dioxide and water, while the manganese of the sodium permanganate is reduced to manganese dioxide and sodium hydroxide is produced from the sodium. The manganic or permanganic salt is used in such a quantity that the oxygen being split off during the reaction is sufficient to oxidize the cellulose and the cellulose like substances to carbon dioxide. The purification may be effected at ordinary temperature, but to shorten the time of the reaction we prefer to boil the mixture for a short time say about ½–1 hour. The manganese dioxide thus obtained can easily be filtered off and the caustic soda lye is obtained free from organic substances and manganese compounds. The carbon dioxide also formed is immediately converted by the caustic soda into sodium carbonate which on cooling separates from the lye concentrated to 30%. The manganese dioxide produced can be melted with sodium hydroxide or sodium carbonate or a mixture thereof in the presence of air and the resulting manganate melt used again without further treatment for the purification of fresh alkali liquor. When only sodium carbonate is used for the production of the manganate melt, sodium hydroxide is formed in the purification process; thus, sodium carbonate is converted through the manganate into caustic alkali in a continuous process and the manganese dioxide can accordingly be used as often as desired for the regeneration of the lye.

This invention is illustrated by the following example without being limited thereto:—

*Example.*—150 grams of sodium permanganate are introduced into one liter of waste caustic soda liquor, containing 17 grams of cellulose like substances per liter and the mixture is heated to boiling. After boiling for about one hour the solution is filtered from the manganese dioxide produced, giving as a filtrate a lye free from organic substances and from manganese. The sodium carbonate, separated on cooling, is melted with fresh sodium carbonate and the manganese dioxide in the presence of air and the manganate melt produced is, after grinding, used again for the purification of fresh lye.

I claim:

1. The process which comprises adding to a waste alkali metal hydroxide solution being contaminated by cellulose and cellulose like substances an alkali metal salt of an acid of the group consisting of manganic and permanganic acid, boiling the mixture, separating the manganese dioxide formed, cooling the solution, separating the separated alkali metal carbonate, melting together the separated alkalimetal carbonate and the separated manganese dioxide in the presence of air, grinding the manganate melt and reintroducing it into the process for the purification of fresh lye.

2. The process which comprises adding to a waste alkali metal hydroxide solution being contaminated by cellulose and cellulose-like substances an alkali metal salt of permanganic acid, boiling the mixture, separating the manganese dioxide formed, cooling the solution, separating the separated alkali metal carbonate, melting together the separated alkali metal carbonate and the separated manganese dioxide in the presence of air, grinding the manganate melt and reintroducing it into the process for the purification of fresh lye.

3. The process which comprises adding to a waste alkali metal hydroxide solution being contaminated by cellulose and cellulose-like substances sodium permanganate, boiling the mixture, separating the manganese dioxide formed, cooling the solution, separating the separated alkali metal carbonate, melting together the separated alkali metal carbonate and the separated manganese dioxide in the presence of air, grinding the manganate melt and reintroducing it into the process for the purification of fresh lye.

FRIEDRICH WILHELM STAUF. [L. S.]